United States Patent [19]

Girod et al.

[11] Patent Number: 5,600,053
[45] Date of Patent: Feb. 4, 1997

[54] PROCESS AND APPARATUS FOR CONTROLLING REACTION TEMPERATURES

[75] Inventors: Christine J. B. Girod, Le Peco; William W. Levy, Paris, both of France; Peter R. Pujado, Palatine; Jacques J. L. Romatier, Riverwoods, both of Ill.; Dominique J. J. M. Sabin, Herbeville, France; Paul A. Sechrist, Des Plaines, Ill.

[73] Assignee: UOP, Des Plaines, Ill.

[21] Appl. No.: 488,991

[22] Filed: Jun. 8, 1995

Related U.S. Application Data

[62] Division of Ser. No. 236,072, May 2, 1994, Pat. No. 5,525,311.

[30] Foreign Application Priority Data

| Jul. 5, 1993 | [FR] | France | 93 08210 |
| Aug. 13, 1993 | [FR] | France | 93 09966 |
| Aug. 13, 1993 | [FR] | France | 93 09967 |

[51] Int. Cl.$^6$ ................................ C07G 5/333
[52] U.S. Cl. ............... 585/654; 585/660; 585/661; 585/911; 585/921; 208/134; 208/137
[58] Field of Search ............... 585/921, 911, 585/654, 660, 661; 208/134, 137

[56] References Cited

U.S. PATENT DOCUMENTS

| 3,666,423 | 5/1972 | Muenger | 422/200 |
| 4,544,544 | 10/1985 | Vu et al. | 423/659 |
| 4,693,807 | 9/1987 | Westerman et al. | 208/108 |
| 4,709,111 | 11/1987 | Ward | 585/911 |
| 4,973,401 | 11/1990 | Vu et al. | 208/134 |
| 5,047,217 | 9/1991 | Vu et al. | 422/200 |
| 5,073,352 | 12/1991 | Vu et al. | 422/213 |
| 5,186,909 | 2/1993 | Vu et al. | 422/213 |

*Primary Examiner*—Anthony McFarlane
*Assistant Examiner*—Walter D. Griffin
*Attorney, Agent, or Firm*—Thomas K. McBride; John G. Tolomei

[57] ABSTRACT

A reactor arrangement and process for indirectly contacting a reactant stream with a heat exchange stream uses an arrangement of corrugated heat exchange plates to control temperature conditions by varying the number and/or the arrangement of the corrugations along the plates. The reactor arrangement and process of this invention may be used to operate a reactor under isothermal or other controlled temperature conditions. The variation in corrugation arrangements within a single heat exchange section is highly useful in maintaining a desired temperature profile in an arrangement having a cross-flow of heat exchange medium relative to reactants. The corrugations arrangement eliminates or minimizes the typical step-wise approach to isothermal conditions.

15 Claims, 13 Drawing Sheets

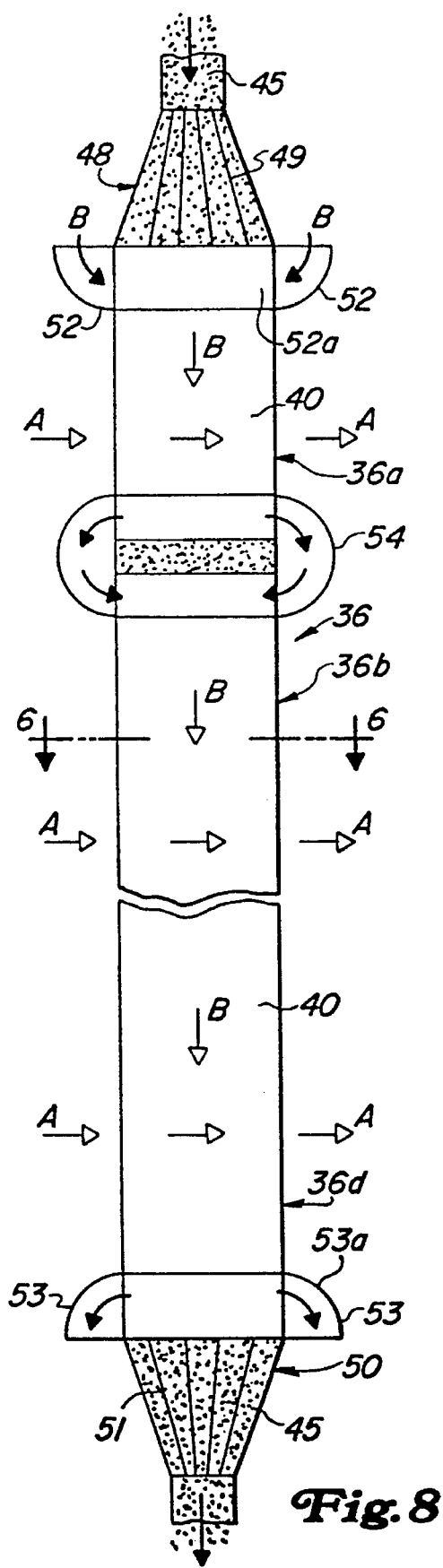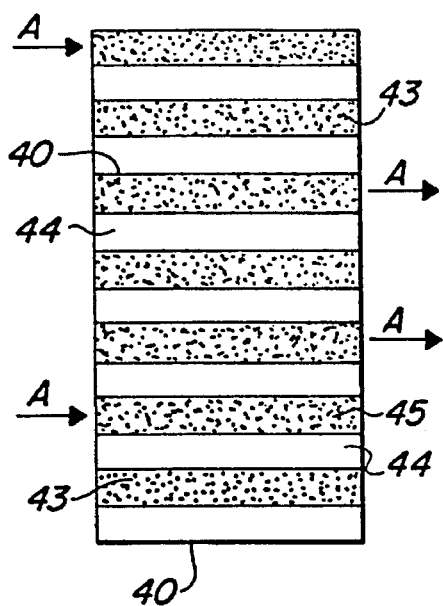
Fig. 8
Fig. 9

PROCESS AND APPARATUS FOR CONTROLLING REACTION TEMPERATURES

This application is a Divisional application of prior application Ser. No. 08/236,072, filed May 2, 1994 now U.S. Pat. No. 5,525,311.

FIELD OF THE INVENTION

This invention relates to chemical reactors for the conversion of a reaction fluid while indirectly exchanging heat with a heat exchange fluid.

BACKGROUND OF THE INVENTION

In many industries, like the petrochemical and chemical industries for instance, the processes employ reactors in which chemical reactions are effected in the components of one or more reaction fluids under given temperature and pressure conditions. Many of these reactions generate or absorb heat, to various extents, and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

One solution for controlling the changes in temperature associated with the heats of various reactions has been to operate several adiabatic reaction zones with intermediate heating or cooling between the different reaction zones. In each adiabatic reaction stage, all of the heat liberated or absorbed during the reaction is transmitted directly to the reactive fluid and the reactor internals. The degree of heat release and the tolerance for temperature change determines the total number of adiabatic reactor zones required in such arrangements. Each zone or adiabatic stage of reaction adds significantly to the overall cost of such a process due to the equipment expense of adding piping and heaters or coolers for intermediate stages of heat transfer to a reactant that passes through the reaction zones. Therefore the number of adiabatic steps is limited and such systems offer at best a stepwise approach to isothermal or other controlled temperature conditions. Moreover, the breaking up of a reaction zone into a series of reactors with intermediate heating or cooling of reactants, especially interferes with reactor arrangements that have continual addition and withdrawal of catalyst from the reaction zone.

Other solutions to the problem of temperature control under the influence of different heats of reaction have employed direct or indirect heating or cooling within the reaction zone. Direct heating or cooling utilizes a compensating reaction having a directionally different heat requirement that occurs simultaneously with the principal reaction. The counter balancing reaction offsets heat release or heat adsorption from the principal reaction. One of the simplest forms of such an arrangement is an endothermic process that uses oxidation of hydrogen to heat reactants in an endothermic reaction.

Another solution has been the indirect heating of reactants and/or catalysts within a reaction zone with a heating or cooling medium. The most well known catalytic reactors of this type are tubular arrangements that have fixed or moving bed catalysts. The geometry of tubular reactors poses layout constraints that require large reactors or limit throughput.

Indirect heat exchange has also been accomplished using thin plates to define channels that alternately retain catalyst and reactants between a heat transfer fluid for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Although the thin heat transfer plates can, to some extent, compensate for the changes in temperature induced by the heat of reaction, the indirect heat transfer arrangements are not able to offer the complete temperature control that would benefit many processes by maintaining a desired temperature profile through a reaction zone.

Many hydrocarbon conversion processes will operate more advantageously by maintaining a temperature profile that differs from that created by the heat of reaction. In many reactions, the most beneficial temperature profile will be obtained by substantially isothermal conditions. In some cases, a temperature profile directionally opposite to the temperature changes associated with the heat of reaction will provide the most beneficial conditions. An example of such a case is in dehydrogenation reactions wherein the selectivity and conversion of the endothermic process is improved by having a rising temperature profile, or reverse temperature gradient through the reaction zone.

A reverse temperature gradient for the purposes of this specification refers to a condition where the change in temperature through a reaction zone is opposite to that driven by the heat input from the reaction. In an endothermic reaction, a reverse temperature gradient would mean that the average temperature of the reactants towards the outlet end of the reaction zone have a higher value than the average temperature of the reactants at the inlet end of the reaction zone. In an opposite manner, a reverse temperature gradient in an exothermic reaction refers to a condition wherein reactants towards the inlet end of the reactor have a higher average temperature than the reactants as they pass toward the outlet end of the reaction section.

It is an object of this invention to provide a reactor that offers greater temperature control of reactants by the indirect heating or cooling of a reaction stream by a heat exchange fluid within a reaction zone.

It is a further object of this invention to provide a process and apparatus used for indirect heat exchange of a reactant stream with a heat exchange stream for controlling the temperature profile through the reaction zone.

Another object of this invention is to provide a process that uses indirect heat exchange with a heat exchange fluid to maintain substantially isothermal conditions or a reverse temperature gradient through a reactor.

It is a yet further object of this invention to provide a reactor arrangement and process that facilitates the continuous transfer of catalyst through a reaction zone that indirectly contacts a reactant stream with a heat exchange fluid.

BRIEF SUMMARY OF THE INVENTION

This invention is a chemical reactor and a process for using a chemical reactor that employs an arrangement of heat exchange plates within the reactor that will maintain reactor temperatures within a desired range during the reaction. Two plate arrangement parameters are varied with the process and reactor arrangement of this invention. The plates used in this reactor arrangement will have corrugations formed over the length of the plate for improving heat transfer across the plates. One of the plate parameters affected by this invention is the relative geometry of the corrugations over different portions of the plates. The other parameter controlled in accordance with this invention is a variation in the number of channels, also expressed the spacing between heat exchange plates, over the length of a heat exchange zone in a reactor. By varying either or both of these parameters, applicants have discovered that a variety of temperature profiles including substantially isothermal or even reverse temperature gradients can be achieved in a reaction zone.

This invention will permit desired control of temperatures through a reaction zone. Preferably this invention will maintain the desired inlet and outlet temperatures within 10° F. and more preferably within 5° F. of desired temperature difference. Where isothermal conditions are desired the inlet and outlet temperature are equal, such that one requirement of the substantially isothermal conditions described in this invention is that the mean inlet and outlet temperature vary by no more than 10° F. and preferably by no more than 5° F.

A process and catalyst reactor arrangement that uses this invention may use single or multiple reaction zones within a reactor vessel. The advantage of this invention is that the reactor vessel can provide the desired temperature gradient without intermediate withdrawal and recycling of reactants or heat exchange medium between the inlet and outer of the reactor. The multiple reaction zones within the reactor vessel can be used to accommodate variations in the depth or pitch angle of the corrugations in the heat exchange plates or changes in the number of heat exchange plates that define the flow channels of the invention.

Accordingly, in an apparatus embodiment, this invention is a reactor for controlling temperature profiles in a reaction zone. The reactor has a plurality of spaced apart plates with each plate having an extended length and defining a boundary of a heat exchange flow channel on one side of the plate and a boundary of a reaction flow channel on an opposite side of the plate. Each plate defines first corrugations having a first depth and a first pitch angle in a first portion of the plate and defines second corrugations in a second portion of the plate. The first plate portion is spaced away from the second portion along the length of the plates. The second corrugations have a second depth and second pitch angle wherein at least one of the second depth and pitch angle varies from the first depth and pitch angle. The apparatus includes means for passing a reaction fluid along a first flow path through a plurality of the reaction flow channels defined by the plates. The apparatus can also include means for contacting the reaction fluid with a catalyst. The invention also includes a means for passing a heat exchange fluid through a plurality of the reaction flow channels defined by the plates along a second flow path.

The primary control parameter of this invention that allows each individual reaction zone to operate at or near a desired temperature profile is a variation in the pitch angle of the corrugations. Heat transfer enhancement provided by corrugations in the thin plates increases as the corrugations become transverse to the flow of the heat exchange fluid. For example, in the case of an endothermic reaction, arranging the corrugations in a more parallel fashion with respect to the heat transfer fluid at the inlet of the reaction zone and the corrugations in a more transverse fashion toward the outlet end of the reaction zone will provide less heat transfer from the heat transfer fluid at the inlet side than at the outlet side of the reaction zone. In this manner, the increased heat transfer of the corrugations toward the outlet of the reaction zone compensates for loss in temperature of the heat exchange fluid as it passes through the reaction zone. The pitch angle of the corrugations may also be varied to compensate for any increasing heat requirements necessitated by the stage of reaction within the reaction zone. In this manner the variation in corrugation pitch allows the single pass of heat transfer fluid to maintain a desired temperature profile despite any loss of heat transfer fluid temperature as it passes through the reaction zone. In more complex arrangements, it may also be possible to alter the heat transfer coefficient along the length of the reaction zone by changing the depth of the corrugations. However, the simplest and primary means for controlling the temperature within the reaction zone is by varying the pitch angle of the corrugations from more parallel to more transverse with respect to the heat exchange fluid flow.

Changes in heat transfer fluid temperature may be further offset by varying the number of flow channels in different reaction sections of a single plate exchanger reaction arrangement. For a given cross sectional flow area, increasing the number of flow channels decreases the space or gap between plates, increases the number of plates and increases heat transfer. By increasing the number of flow channels, the plate exchange surface area is increased relative to other reaction sections to achieve a more complete approach to the maximum temperature of the heat transfer fluid. Application of the flow channel variation to an endothermic reaction would pass the heating fluid into a reactor and into a first reaction section having plates defining a first number of flow channels. For the purposes of this description a reaction section refers to an arrangement of plates defining a fixed number of spaces between the plates. The heating fluid would then flow out of a first reaction section into a redistribution manifold and then into a second reaction section having a greater number of plates that define an increased number of flow channels for the heating fluid and for the reactants. In such an arrangement, the combination of pitch angle variations in the corrugations of each reaction section would maintain the desired temperature profile within each reaction section and the increase in the number of plates or flow channels will maintain overall average temperatures from reaction section to reaction section within a single system of reaction sections. Both of these effects will allow temperature conditions within a process to be beneficially controlled.

Accordingly, in a process embodiment, this invention is a process for controlling the temperature of a reactant stream in a chemical reaction by indirect heat exchange with a heat exchange fluid across a multiplicity of plate elements. The process passes a heat exchange fluid from a heat exchange inlet to a heat exchange outlet through a first set of elongated channels formed by a first side of the plates. The process also passes a reactant stream from a reactant inlet to a reactant outlet through a second set of channels formed by a second side of the plates. The reactant stream may contact a catalyst in the second set of channels. The process exchanges heat between the heat exchange fluid and the reactant stream by contacting at least the reactant or the heat exchange fluid with corrugations formed by the plates and having a pitch, pitch angle, or corrugation depth adjacent to the reactant inlet or the heat exchange inlet that differs from the pitch, pitch angle or corrugation depth adjacent to the heat exchange outlet or the reactant outlet.

The process may be useful in a wide variety of catalytic reactions. This invention is most beneficially applied to catalytic conversion process having high heats of reaction. Typical reactions of this type are hydrocarbon conversion reactions that include: the aromatization of hydrocarbons, the reforming of hydrocarbons, the dehydrogenation of hydrocarbons, and the alkylation of hydrocarbons. Specific hydrocarbon conversion processes to which this invention are suited include: catalytic dehydrogenation of paraffins, reforming of naphtha feed streams, aromatization of light hydrocarbons and the alkylation of aromatic hydrocarbons.

The reaction zones for the process of this invention may indirectly contact the reactants with the heat exchange fluid in any relative direction. Thus, the flow channels and inlet and outlets of the reaction zones may be designed for cocurrent, countercurrent, or cross-flow of reactant and heat exchange fluid. Preferred arrangements for practicing this invention will pass reactants in cross-flow to the heat exchange fluid. Cross-flow of reactants is generally preferred to minimize the pressure drop associated with the flow of reactants through the reactor. For this reason, a cross-flow arrangement can be used to provide the reactants with a shorter flow path across the reaction zone.

The shorter flow path, particularly in the case of the reactant stream contacting heterogeneous catalysts, reduces overall pressure drop of the reactants as they pass through the reactor. Lower pressure drops can have a two-fold advantage in the processing of many reactant streams. Increased flow resistance i.e., pressure drop, can raise the overall operating pressure of a process. In many cases, product yield or selectivity is favored by lower operating pressure so that minimizing pressure drop will also provide a greater yield of desired products. In addition, higher pressure drop raises the overall utility and cost of operating a process.

It is also not necessary to the practice of this invention that each reactant channel be alternated with a heat exchange channel. Possible configurations of the reaction section may place two or more heat exchange channels between each reactant channel to reduce the pressure drop on the heat exchange medium side. When used for this purpose, a plate separating adjacent heat exchange channels may contain perforations.

Additional embodiments, arrangements, and details of the invention are disclosed in the following detailed description of the invention.

BRIEF DESCRIPTION OF THE DRAWINGS

FIG. 8 is a diagrammatic elevation view of a typical catalytic reaction stack forming the star shaped arrangement of FIG. 5.

FIG. 9 is a sectional view along the line 6—6 of FIG. 8.

DETAILED DESCRIPTION OF THE INVENTION

By its very design, the reactor according to this invention has the advantage of maintaining, with simple means, desired temperature profiles including isothermal or reverse gradient temperature conditions during the flow of the reactive fluid in the reactor, by means of a heat transfer medium.

The process and reactor arrangement may use homogeneous or heterogeneous catalysts. Homogeneous catalyst will typically comprise liquid catalysts that flow through reaction channels along with the reactants and are separated for recovery and recycle outside of the reaction zone. This reactor arrangement provides particular benefits with heterogeneous catalysts that are typically retained within the reactant channels by the corrugated plates and permeable members that retain the catalyst but permit the flow of reactants therethrough. In most cases, the heterogeneous catalyst will comprise particulate material retained between the plates and the reactor may be arranged to permit the continuous addition and withdrawal of particulate material while the reactor is on stream.

Figure 1:
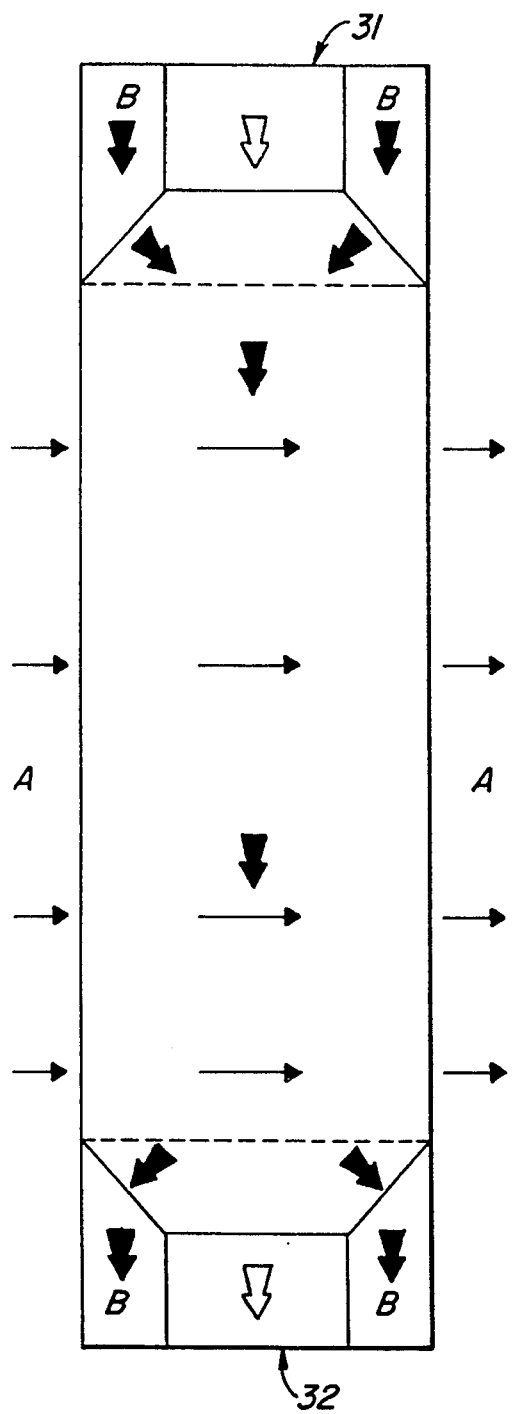
FIG. 1 is a schematic representation of a catalytic reaction section of this invention showing a preferred direction for the circulation of fluids and catalyst.

The type and details of the reactor arrangements contemplated in the practice of this invention is best appreciated by a reference to the drawings. FIG. 1 is a schematic representation of a catalytic reactor section designed to effect a catalytic reaction on a reactant fluid while using indirect heat exchange with a heat transfer fluid to maintain favorable reaction temperatures as the reactant fluid flows through the reaction section. To this end, the catalytic reaction section comprises a stack of parallel plates 10 of the type represented in FIG. 2. Each plate 10 has a central pan 12 that forms inclined corrugations 13. Preferably each plate 10 will also contain smooth edges 11 that facilitate the assembly of multiple plates into channels. Referring again to FIG. 1, each plate 10 is stacked next to adjacent plates 10 to form two circulation systems, the first one A for a flow of a reactive fluid and the second one B for flow of an auxiliary fluid. Together FIGS. 1 and 2 define specific circulation systems A and B, wherein the reactive fluid and the heat exchange fluid respectively, flow in crosswise directions, i.e. perpendicular and through alternate channels formed between adjacent plates 10.

Suitable plates for this invention will comprise any plates allowing a high heat transfer rate and which are readily formed into a stable corrugated pattern. The plates may be formed into curves or other configurations, but flat plates are generally preferred for stacking purposes. Thin plates are preferred and typically have a thickness of from 1 to 2 min. The plates are typically composed ferrous or non-ferrous alloys such as stainless steels.

Figure 2:
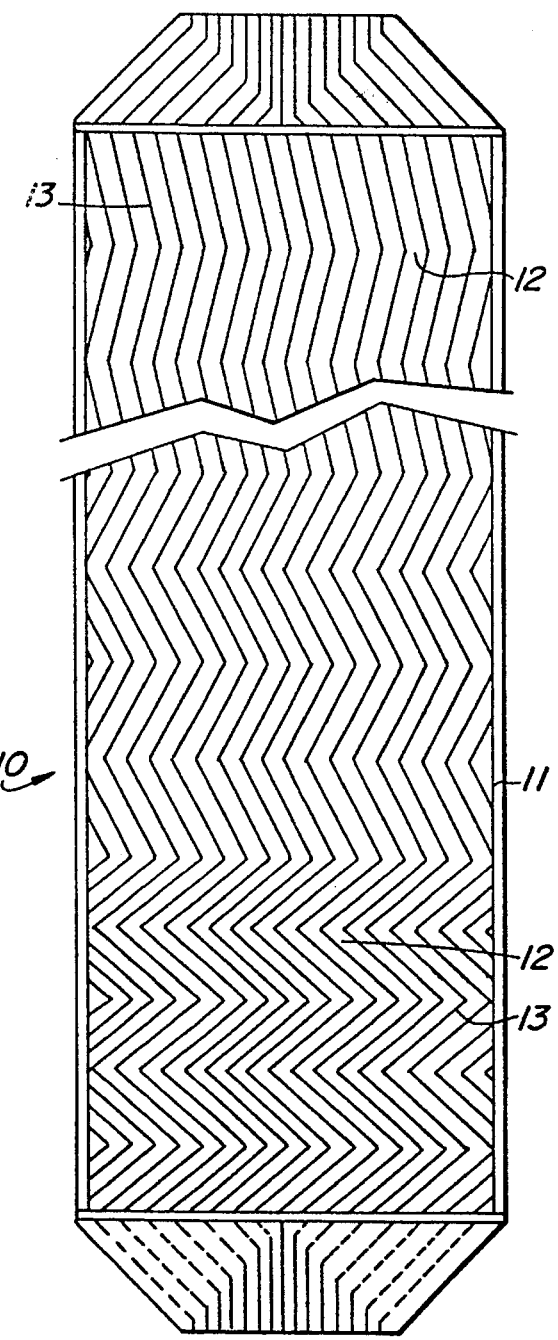
FIG. 2 is a schematic front view of a plate that forms a portion of the channels in the catalytic reaction section of this invention.

Referring again to FIG. 2 variation in the corrugation arrangement is a preferred method for controlling the temperature profile. The plate arrangement for FIG. 2 represents a typical corrugation pattern for an exothermic or endothermic process. In order to maintain a substantially isothermal or rising temperature profile in such a preferred arrangement the heat transfer fluid flows downwardly through the corrugations on one side of the plate and the reactant stream flows horizontally across the plate on an opposite side. At the upper inlet end the pitch angle of the corrugations is small, i.e. the principle direction of the corrugations approach a parallel alignment with the heat exchange fluid flow. At the lower end of the plate where the heat exchange fluid exits, the pitch angle of the corrugations is wide to increase relative heat transfer, i.e. the principle direction of the corrugations approach a perpendicular or transverse alignment with respect to the heat exchange fluid flow. Corrugation pitch angles can be in a range of from greater than 0° to less than 90° degrees. Typically the corrugation pitch angle from an inlet to an outlet section of a plate will range from about 10° to 80°, and more typically in a range of about 15° to 60°. In a particularly preferred arrangement, the plates will make an angle of less than 30° at the inlet end of the plate and an angle of more than 35° at the outlet end of the plate. The varying corrugations may be formed in a continuous plate section or the plate section of the type shown in FIG. 2 may be made from several plates having corrugations at different pitch angles.

The corrugated plates may be spaced apart or positioned against adjacent plates to form the alternate flow channels. Narrow spacing between the plates is preferred to maximize heat transfer surface. Preferably the corrugation pattern will be reversed between adjacent plates in a reactor section. In this manner the general herring bone pattern on the faces of opposing corrugated plates will extend in opposite directions and the opposing plate faces may be placed in contact with each other to form the flow channels and provide structural support to the plate sections.

Preferably system A, in which the reactant fluid circulates, includes a heterogenous catalyst in the form of particles. The catalyst particles typically comprise grains of a small size. The particles may take on any kind of shape, but usually comprise small spheres or cylinders.

In addition, for the purpose of catalyst loading and unloading, the catalytic reactor may include means for passing catalyst through the reactant channels. FIG. 1 shows such means 31, schematically represented, for distributing catalyst in the channels of system A, and in its lower part, means 32, schematically represented, for collecting catalyst during replacement operations.

Figure 3:
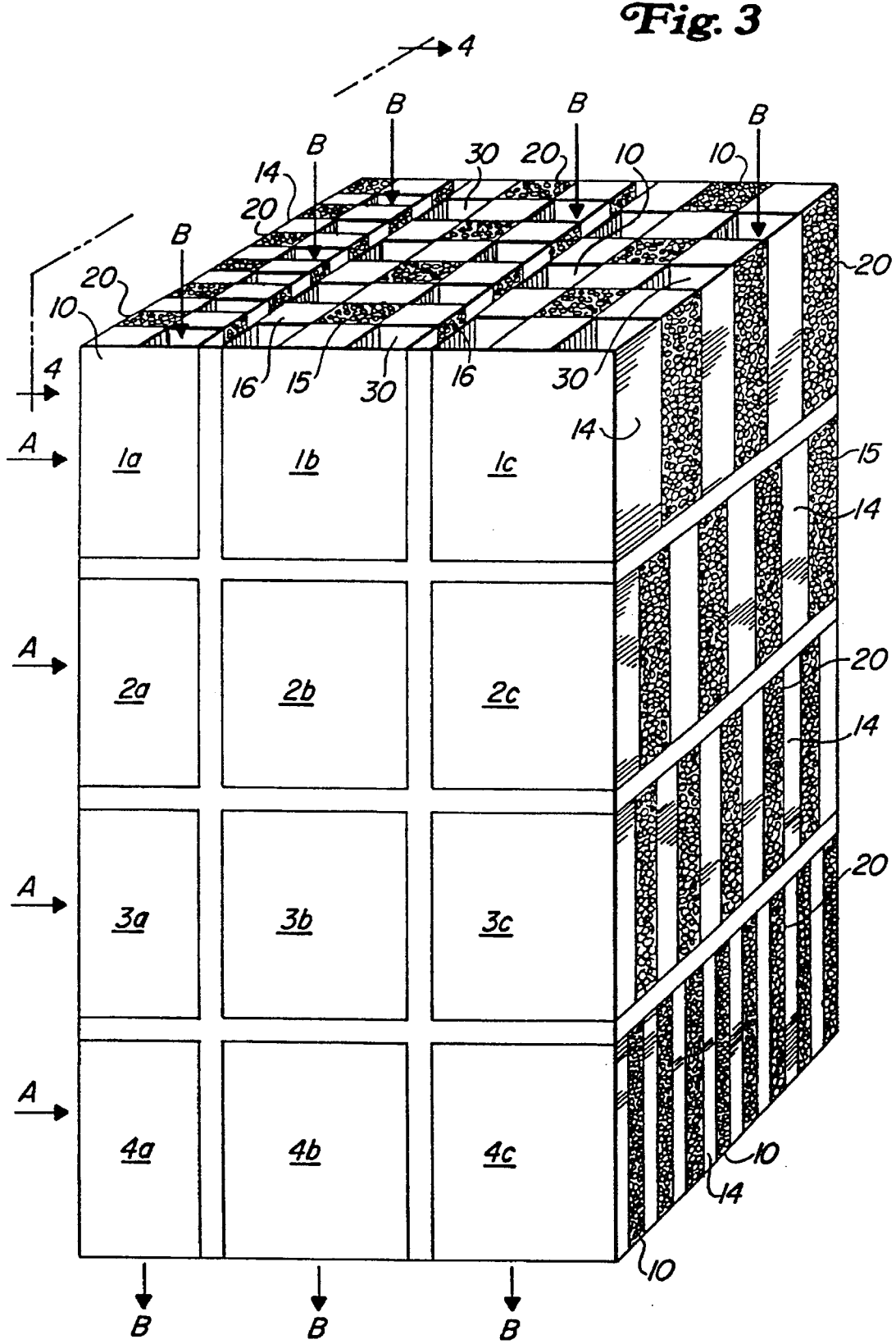
FIG. 3 is a schematic exploded view of a catalytic reactor arranged in accordance with this invention.
Figure 4:
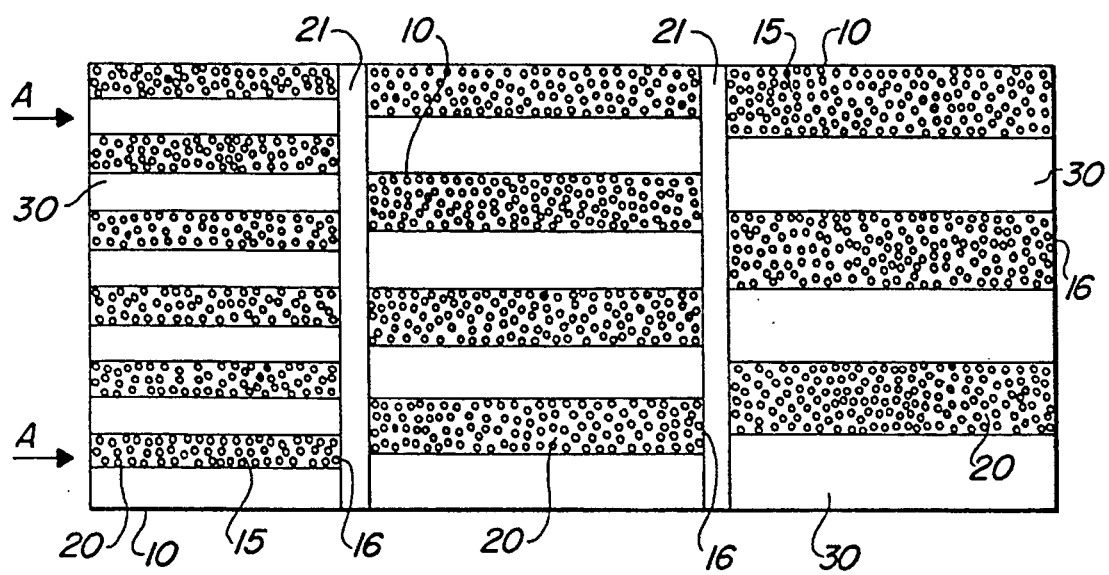
FIG. 4 is a sectional view taken at section 4—4 of FIG. 3.

FIGS. 3 and 4 represent a highly schematic reactor arrangement of the invention showing a generalized arrangement of plates assembled into alternate channels. (In order to simplify the drawing the corrugations have not been shown.) For this purpose, spacers 14 are attached, as represented in FIG. 3, by a suitable method such as welding along the sides of plates 10 to form channels 20, which are open along opposite vertical sides of the reactor arrangement for the flow of reactant fluid as shown by arrows A (system A), and channels 30, which are open at the top and bottom of the reactor arrangement for the flow of heat exchange fluid as shown by the arrows B (system B).

When flowing through particle containing channels 20 of system A, the reactant fluid undergoes a catalytic reaction accompanied by a liberation or an absorption of heat. The function of the heat exchange fluid circulating in system B is to convey the heat to be added to or removed from the reactive fluid, in order to maintain favorable reaction conditions. Such conditions can again include isothermal conditions during the circulation of the afore-mentioned reactive fluid in the catalytic reactor or a reverse temperature gradient. The heat exchange fluid is either a gas or a liquid, depending on the specific operating conditions of each process.

The specific heat transfer relationship for the plate exchange is established by the fundamental equation expressing heat transfer between two fluids. This relationship is as follows:

$$P = h \times S \times LMTD$$

where:
is the amount of heat exchanged, h is the local or overall heat transfer coefficient, S is the heat exchange area between fluids, and LMTD is the logarithmic mean temperature difference.

The logarithmic mean temperature difference is readily determined by the desired temperature difference at any point along the plate.

For a series of corrugated plates defining alternate channels of catalyst particles and heat exchanger fluid, the local or overall/heat transfer coefficient can be calculated by using the following equation:

$$h = f(a, e, dp)$$

where a is the pitch angle of the corrugations, e is the distance between two plates 10, and dp is the equivalent diameter of catalyst particles.

Appropriate values of h can be established by modeling or computed using known correlations for establishing heat transfer coefficients over corrugated surfaces and, where present, through particle beds. Correlations for localized heat transfer through particle beds may be found in Leva, Ind. Eng. Chem., 42, 2498 (1950). Correlations for heat transfer along corrugations are presented in AIChE Symposium Series No. 295 Vol. 89 Heat Transfer Atlanta (1993).

The area of exchange between the reactive fluid and the auxiliary fluid can be calculated by using the equation:

$$S = \epsilon \times n \times l \times L$$

where: $\epsilon$ is a correction factor for the elongation of the plates resulting from the corrugations, n is the number of plates in contact with both heating and reactant fluids, 1 is the plate width, and L is the plate length.

By varying the number of plates and the characteristics of the corrugations, especially the pitch angle of the corrugations, the invention provides means for maintaining desired temperature conditions in the reactant fluid flow direction.

As shown in the embodiment of FIG. 3, the means for controlling and maintaining temperature conditions consists of having distinct sections 1a, 1b, 1c, 2a. . . 4b, 4c, of heat exchange between the reactant fluid circulating in system A and the heat exchange fluid circulating in system B. In FIG. 3, the distinct heat exchange sections 1a, 1b, 1c, 2a. . . 4b, 4c, are distributed in the reactant fluid flow direction and in the heat exchange fluid flow direction, so as to form rows 1, 2, 3, and 4, and columns a, b, and c. In other arrangements of this invention, these distinct heat exchange sections can be distributed solely in the reactant fluid flow direction or solely in the heat exchange fluid flow direction. The total number of distinct reaction sections defined in the entire catalytic reactor of FIG. 3 is obtained by multiplying the number of rows 1, 2, 3 and 4 by the number of columns a, b and c. All the heat exchange sections of a particular row have the same vertical height and all the heat exchange sections of a particular column have the same horizontal width.

Varying the number of plates 10 as represented in FIGS. 3 and 4 increases the heat exchange in the higher numbered rows or lowered lettered columns by adding heat exchange areas between the reactant fluid and the heat exchange fluid in each of the afore-mentioned sections. To obtain a variation of heat exchange within sections 1a, 1b, 1c, 2a, 2b. . . 4b, 4c, this invention modifies each of these sections by preferably varying the pitch angle of the corrugations. As represented in FIG. 2, the pitch angle of the corrugations 13 can be more parallel in relation to the reactant fluid flow direction where a high transfer coefficient is required, and more transverse to the fluid flow direction in the heat exchange areas where a low transfer coefficient is required.

The number of plates 10 can increase or decrease from the entry to the exit of the reactive fluid. FIG. 4 shows, as an example, a variation of heat exchange sections from a large number to a small number of plates 10 along the flow path of the reactive fluid.

Where the invention uses a heterogeneous catalyst, the catalytic reactor includes means for containing catalyst 15 in the channels 20 of the reactive fluid circulation system A. As shown in FIGS. 3 and 4, the catalyst containing means can consist of grids 16 placed on either side of channels 20 in each heat exchange area 1a, 1b, 1c, 2a. . . 4b, 4c. These grids 16 cover the whole width of channels 20, and the mesh size of each grid is inferior to the catalyst 15 grain size.

In addition, where the catalytic reactor of this invention uses a multiplicity of distinct heat exchange sections (1a, 1b, 1c, 2a. . . 4b, 4c), means for mixing and distributing the reactive and/or the heat exchange fluid are provided. As shown in FIG. 4, these means consist of connecting distribution spaces 21 located between the afore-mentioned heat exchange areas.

Figure 5:
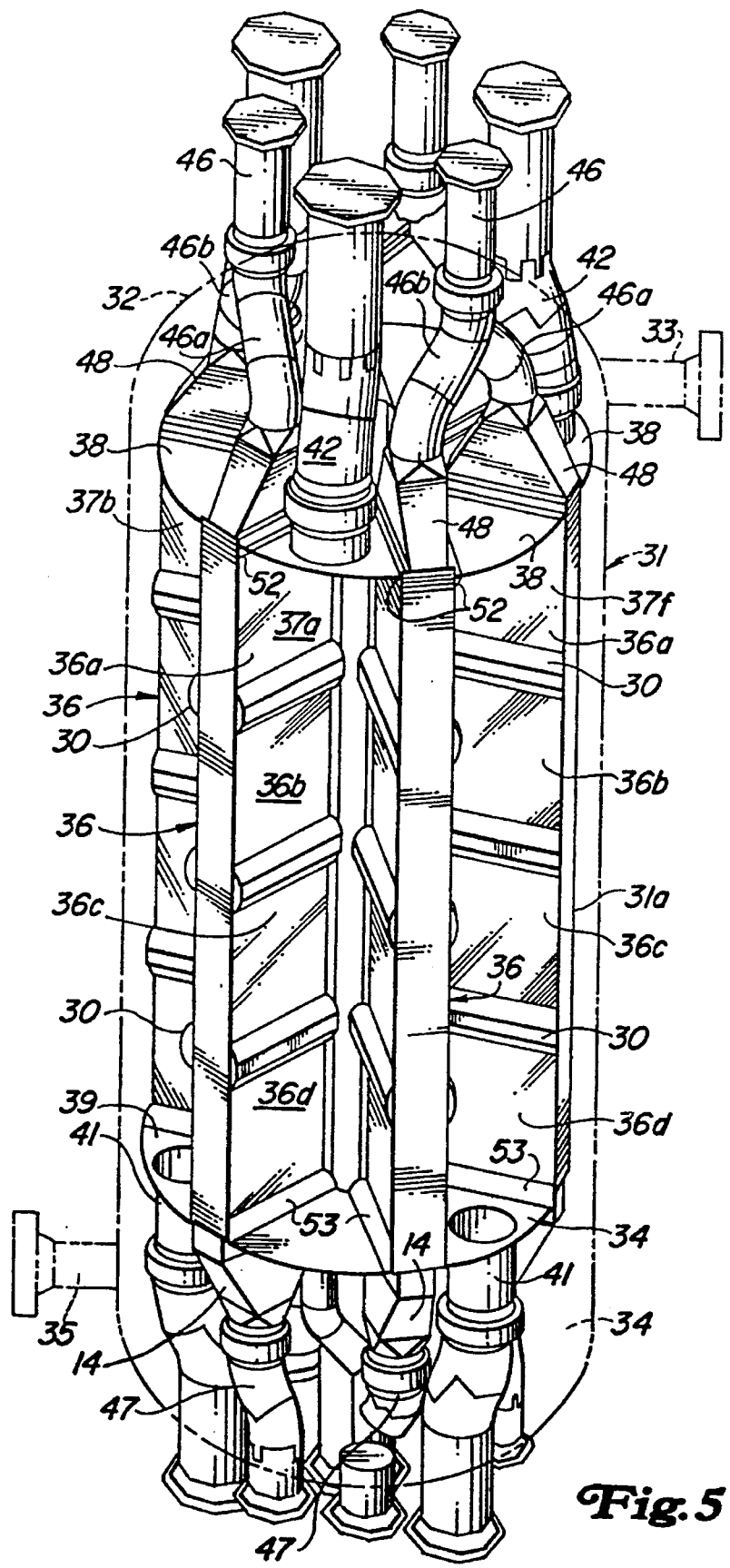
FIG. 5 is a diagrammatic perspective view of a catalytic reactor of this invention with a star shaped arrangement of reactor stacks.
Figure 6:
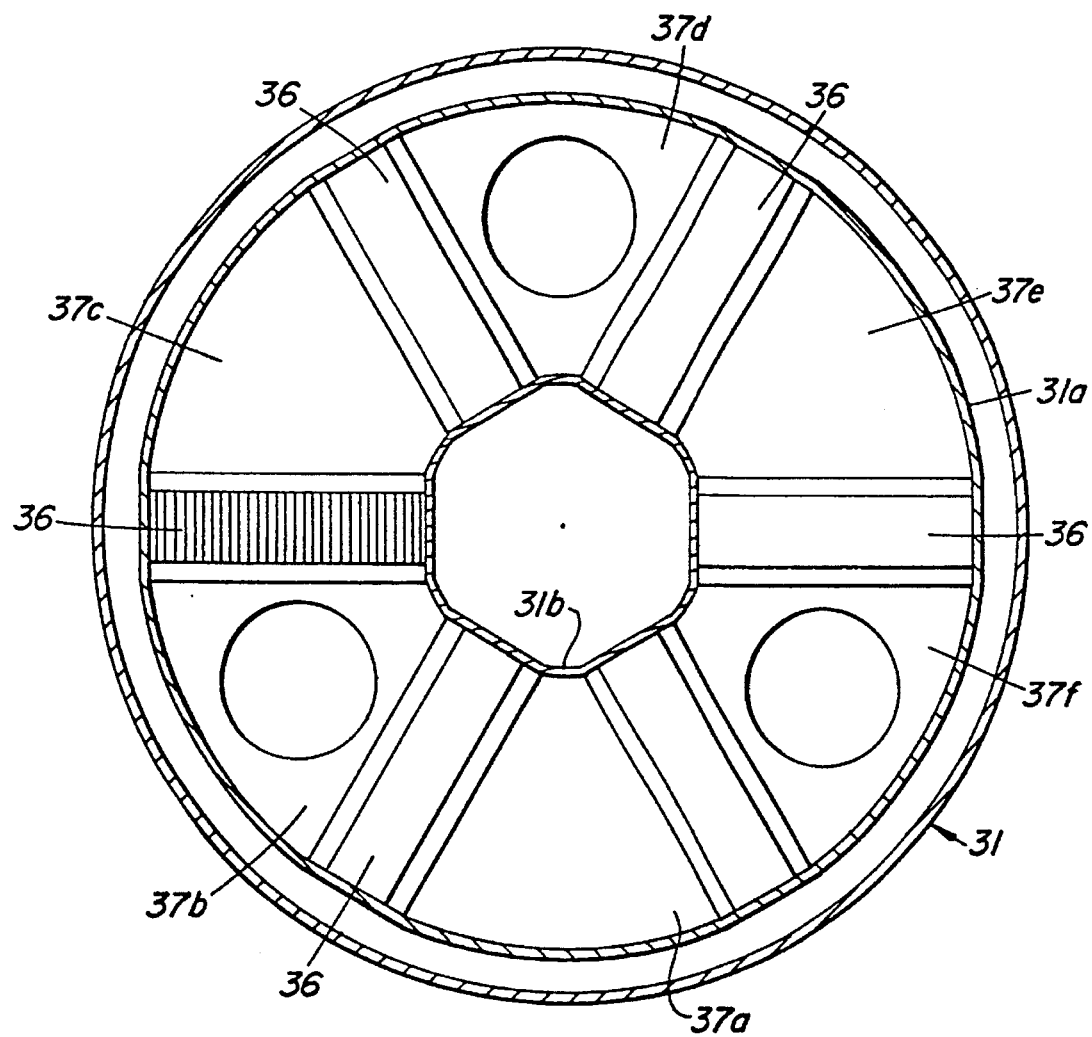
FIG. 6 is a transverse section view of the reactor arrangement represented in FIG. 5.

FIGS. 5 and 6 diagrammatically show a more specific embodiment of a complete reactor arranged according to this invention. The reactor contains multiple reaction stacks with each stack containing multiple reaction sections. The reactor effects catalytic reaction of a horizontally flowing reactant fluid under controlled temperature conditions, by indirect contact with a vertically flowing heat transfer fluid while permitting movement of catalyst through the reaction stacks.

The reactor comprises a vessel, of circular cross section, designated in its entirety by the reference 31 and shown by the dot-dash lines in FIG. 5. The vessel 31 includes a head 32, for example of hemispherical shape, on which emerges a nozzle 33 for supplying heat exchange fluid, and a bottom head 34, for example of hemispherical shape, on which emerges a nozzle 35 for outlet of the heat exchange fluid.

Figure 7:
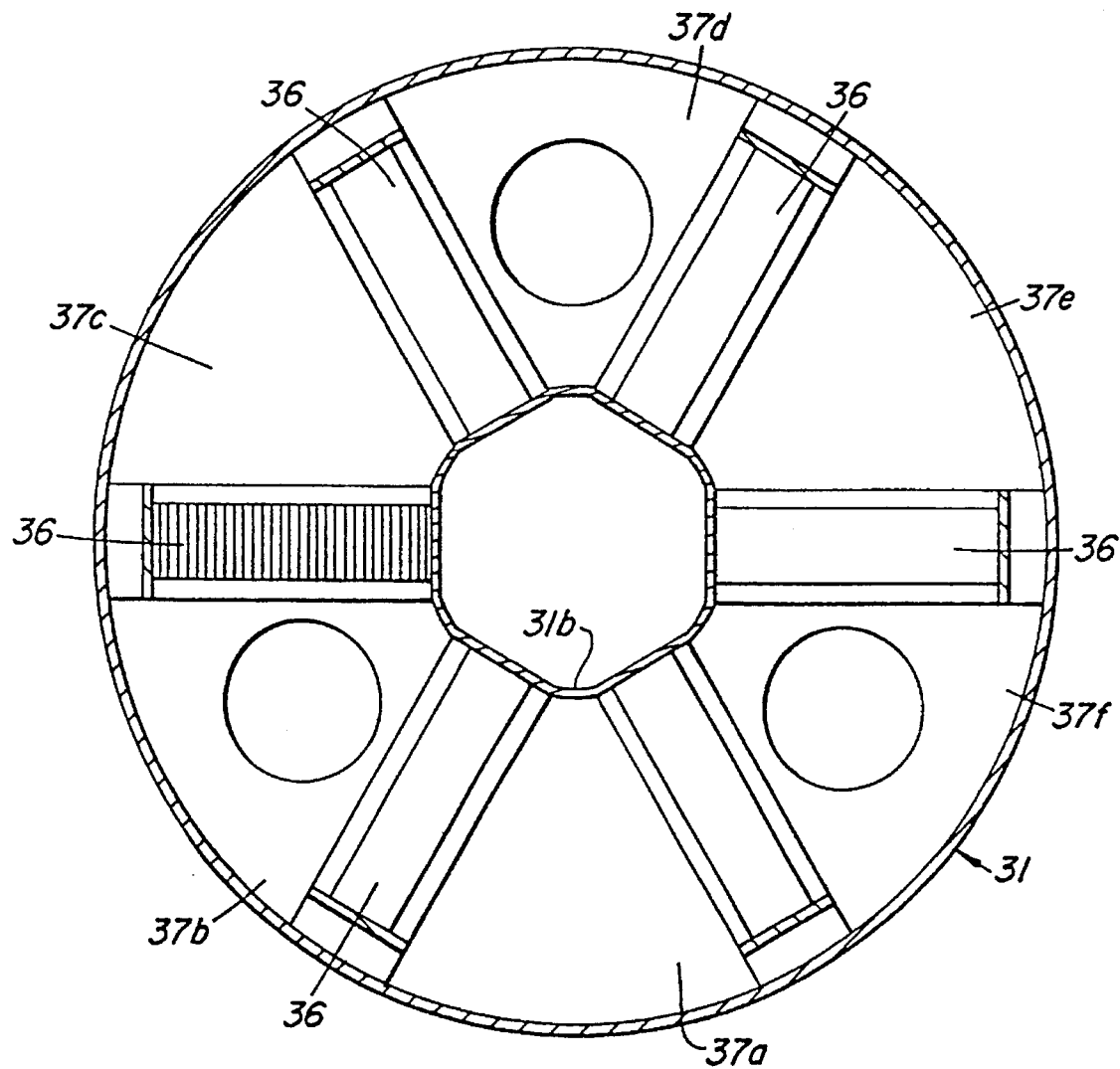
FIG. 7 is a transverse section view of an alternate interior arrangement for the reactor of FIG. 5.

As shown in FIG. 6, the catalytic unit includes two concentric walls 31a and 31b which are arranged inside vessel 31 and between which walls are arranged reaction stacks 36. Reaction stacks 36 are vertical and distributed in a star configuration between walls 31a and 31b of vessel 31. FIG. 7 shows a variation of FIG. 6 wherein vessel 31 constitutes outer wall 31a. The number of reaction stacks 36 is preferably an even number and, in FIGS. 5–7, is equal to six.

The sides of reaction stacks 36 define a portion of feed zones 37a, 37c and 37e arranged alternately between stacks 36 for distributing the reactive fluid and a portion of recovery zones 37b, 37d and 37f arranged alternately between stacks for recovering the reactive fluid. Upper pans of the zones 37a, 37b . . . 37f are blocked off by horizontal plates 38, each arranged between the reaction stacks 36, and the lower parts of the zones 37a, 37b . . . 37f are blocked off by horizontal plates 39, each arranged between the reaction stacks 36. The star arrangement gives each zone 37a, 37b . . . 37f a triangular prismatic shape, with one of the apexes oriented towards the inside of the vessel 36. In other embodiments, not shown, each zone 37a . . . 37f may be divided by a vertical wall into two half-zones with the subdivided parts of the zones providing one feed zone and one recovery zone.

The feed zones 37a, 37c, and 37e are joined to means for inlet of the reaction fluid, which in one form comprises pipes 42, and the recovery zones 37b, 37d and 37f are joined to means for discharging this reaction fluid which in one form comprise pipes 41.

As shown in FIGS. 8 and 9, each reaction stack 36 comprises a plurality of parallel plates 40. The plates 40 are arranged perpendicular to the radius of the vessel 31 and extend downwardly through each of the reaction stacks 36. Each plate 40 forms, together with the adjacent plates 40, the previously described circulation circuits A and B. Channels 43 contain horizontal flow through circuit A for the passage of the reactant fluid and channels 44 contain vertical flow through circuit B for the passage of the heat transfer fluid. The circuit A for circulation of the reactive fluid again contains a particulate catalyst 45. The reactor contains means for passing catalyst into the circuit A of each reaction stack 36 and means for withdrawing catalyst from the circuit A of each reaction stack 36. As shown in the specific arrangement of FIG. 5, catalyst feed pipes 46, the number of which is equal to half the number of reaction stacks 36, receive fresh catalyst particles. Each pipe 46 is divided into two sub-pipes 46a and 46b, that deliver catalyst particles to the upper part of reaction stack 20.

A plurality of catalyst discharge pipes 47 are each connected with a lower part of each reaction stack 36. Pipes 47 pass directly out of vessel 31 to improve catalyst removal. Catalyst particles may be removed from the reactor either periodically or continuously and returned to the reactor stacks after regeneration.

FIGS. 5 and 8 show a diffuser 48 in the upper part of each reaction stack for distributing catalyst into circuit A and a collector 50 at the bottom of stacks 36 for withdrawing catalyst. Diffusers 48 may be fitted with internal baffles or corrugations 13 for distributing the catalyst. Each collector 50 includes internal baffles or corrugations 51 to regulate the flow of the said catalyst into pipe 47.

Each reaction stack 36 includes, in its upper pan, at least one inlet for receiving the heat exchange fluid into circuit B. The inlet may be a single opening. FIGS. 5 and 8 show reaction stack 36 having the inlet in the form of two lateral bowl shaped inlets 52 each arranged on opposite sides of the corresponding reaction stack 36. Inlet 52 opens to the interior of vessel 31, which contains the heat exchange fluid from fluid nozzle 33. The heat exchange fluid is introduced into circuit B from inlet 52 by a distribution zone 52a.

Each reaction stack 36 also typically includes, in its lower part, at least one collector for recovering the heat exchange fluid at the outlet of the circuit B. FIGS. 5 and 8 show each reaction stack 36 having two lateral collectors 53, each arranged on one side of the reaction stack 36 to receive heat transfer fluid from a recovery zone 53a that communicates with channels 44. The collectors communicate, via the open portion of the vessel 31 below plate 39, with the outlet nozzle 35 for withdrawing the heat exchange fluid.

The embodiment shown in FIGS. 5–9 shows each reaction stack 36 divided into a plurality of reaction sections 36a, 36b, 36c and 36d which are joined together by intermediate connecting zones 54. Connecting zones 30 serve as redistribution manifolds to permit the segregated passage of the heat exchange fluid and the catalyst between the various reaction sections 36a, 36b, 36c and 36d.

A typical mode of operation passes reactant fluid, heat exchange fluid and, optionally, catalyst through the reactor 31. Reactant fluid enters reactor 31 via the pipes 42, passes into the feed zones 37a, 37c and 37e, then passes horizontally through two adjacent reaction stacks 36 via the circuit A and emerges in the recovery zones 37b, 37d and 37f. Pipes 41 subsequently discharge the reactant fluid. The heat exchange fluid enters the upper part of the vessel 31 via the nozzle 33, passes into the reactor stacks 36 via the inlet zones 52 and the distribution zone 52a. The heat exchange fluid passes vertically through the reactor stacks 36 via the circuit B and exits the reaction stack 36 via the recover zones 53a and the collectors 53. The heat exchange fluid emerges into the lower pan of the vessel 31 and exits via the nozzle 35. Catalyst 45 enters circuit A of each reaction stack 36 via the pipes 46, the sub-pipes 46a and 46b and the diffuser 48 wherein the reactive fluid contacts the catalyst in the circuit A. Collectors 50 and pipes 47 periodically or continuously withdraw catalyst from the bottom of reaction stack 36.

In order to maintain the desired temperature profiles while the reactant fluid passes through the catalyst of each reaction section 36a, 36b, 36c and 36d, each section varies the pitch angle of the corrugations defined by plates 40. The number of plates in each successive downwardly located reaction section 36(a–d) increases to progressively add surface area for heat exchange between the reaction fluid and the heat exchange fluid down the length of each reaction stack 36.

Preferably, the reaction stacks 36 are kept under compression within vessel 31 by the heat exchange fluid. The operating pressure of the heat exchange fluid is typically regulated to a value slightly higher than that of the reaction fluid. For this purpose, the heat exchange fluid usually fills the vessel 31 and surrounds the reaction stacks 36.

Figure 10:
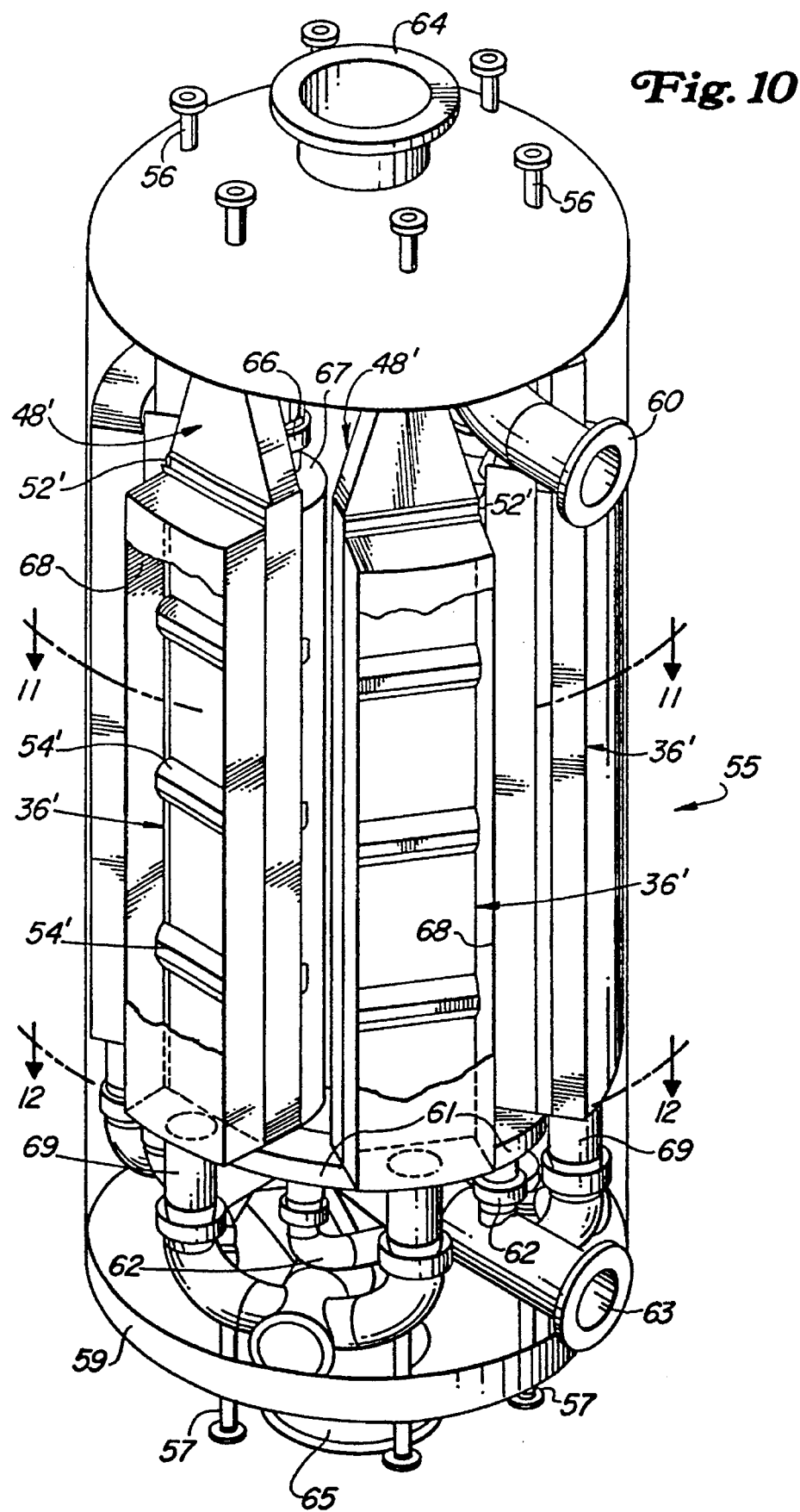
FIG. 10 is a diagrammatic perspective view of a catalytic reactor of this invention with a polygonally shaped arrangement of reactor stacks.

The vessel 31, may have the reaction stacks 36 located therein in a variety of different arrangements. Another type of arrangement as shown in FIG. 10 places the reaction stacks such that the plates 40 are substantially parallel to the radius of a vessel 55. The arrangements of plates 40 parallel to the radius of vessel 55 provides a generally polygonal configuration for the reaction stacks. The reaction stacks form a substantially circumferential ring within the reactor vessel 55.

Figure 11:
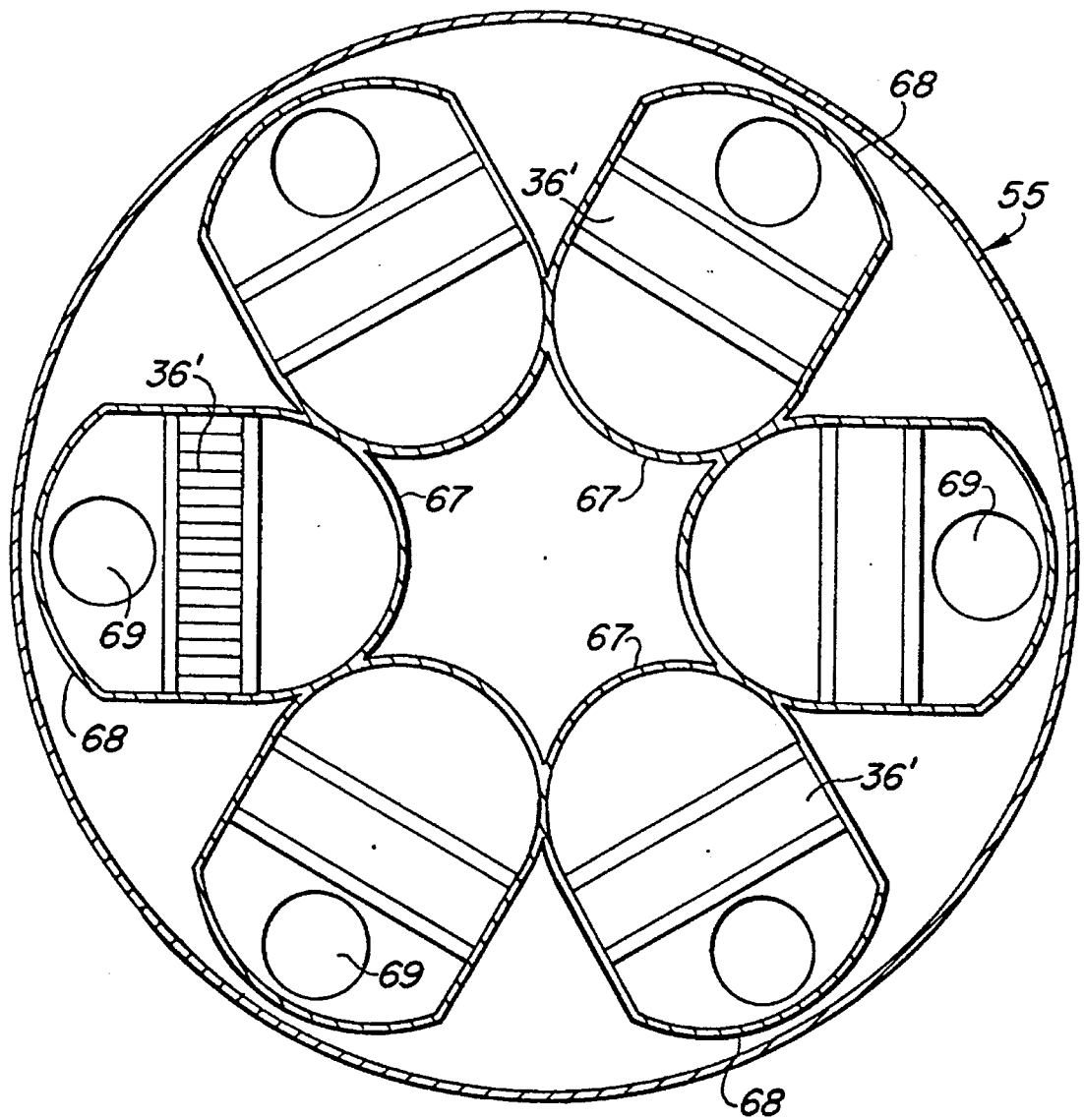
FIG. 11 is a section view along the line 11—11 of FIG. 10.
Figure 12:
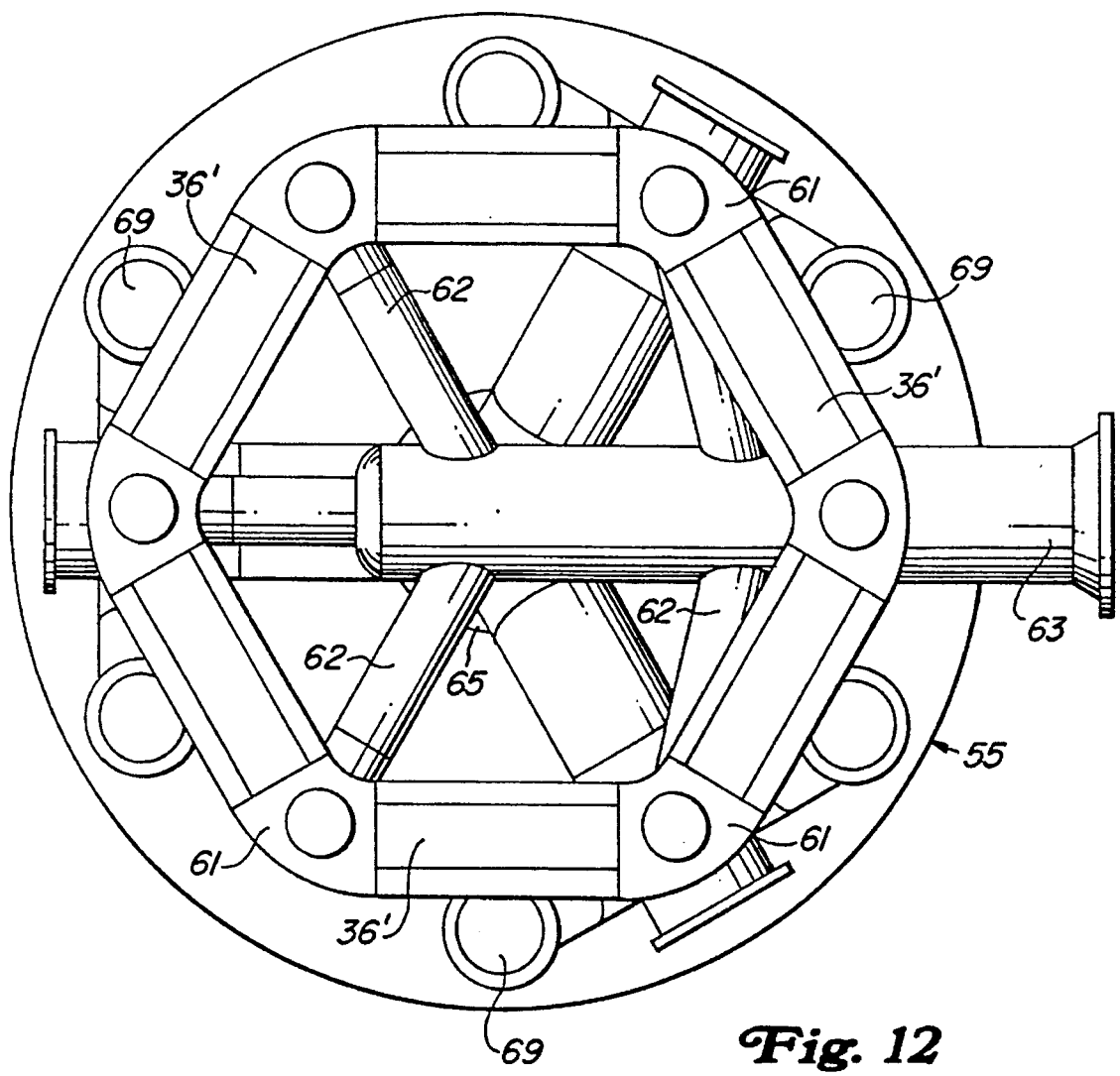
FIG. 12 is a section view along the line 12—12 of FIG. 10.

In FIGS. 10–12, piping and duct arrangements for the delivery and recovery of reaction fluids, heat exchange fluids, and catalysts are substantially similar to those described for the reactor arrangement of FIGS. 5–9 and all details of the reaction stacks are also substantially similar to those described. Catalyst particles enter the reactor vessel 10 through nozzle 56. Diffusers 48' at the top of reaction stacks 36' transfer the catalyst into the reaction stacks across upper head 58. Nozzles 57 withdraw catalyst from the reactor stacks 36' through a collector of the type previously described and across lower head 59. The heat exchange fluid enters reactor 55 through a nozzle and fills the interior of vessel 55. The heat transfer fluid enters the reaction stacks 36' through an inlet 52' and passes through adjoining reaction sections by connecting zones 54'. Collectors at the bottom of reactor stacks 36' discharge the heat exchange fluid into a collection manifold 61. Pipes 62 withdraw heat exchange fluid from manifold 61. Pipes 63 collects heat exchange fluid from pipes 62 to withdraw the heat exchange fluid from vessel 55. Additional details of manifold 61 and pipes 62 and 63 are shown in FIG. 12. The reaction fluid flows through vessel 55 from an inlet nozzle 64 to an outlet nozzle 65. Nozzle 64 distributes the reaction fluid to multiple distributor pipes 66. Each distributor pipe 66 delivers reaction fluid to a distribution chamber 67. Each distribution chamber 67 covers the side of each reaction stack 36' that faces the interior of the vessel 55. Distribution chambers 67 have a closed bottom that forces the flow of reaction fluid across each reaction stack 36' and into a collector 68 that seals an opposite face of each reaction stack 36'. The upper portion of each collector 68 is closed to direct the exiting flow of reaction fluid into conduits 69 for collection and withdrawal by nozzle 65.

Figure 13:
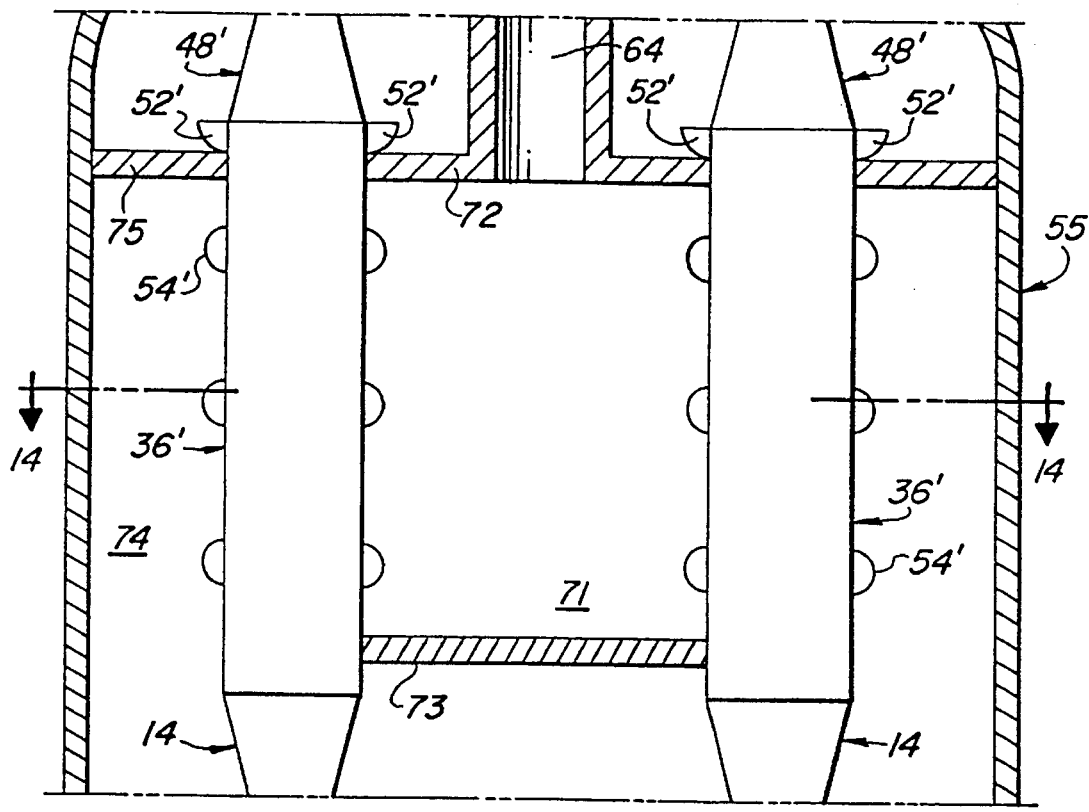
FIG. 13 is a partial diagrammatic elevation view of an alternate reaction stack arrangement according to this invention.
Figure 14:
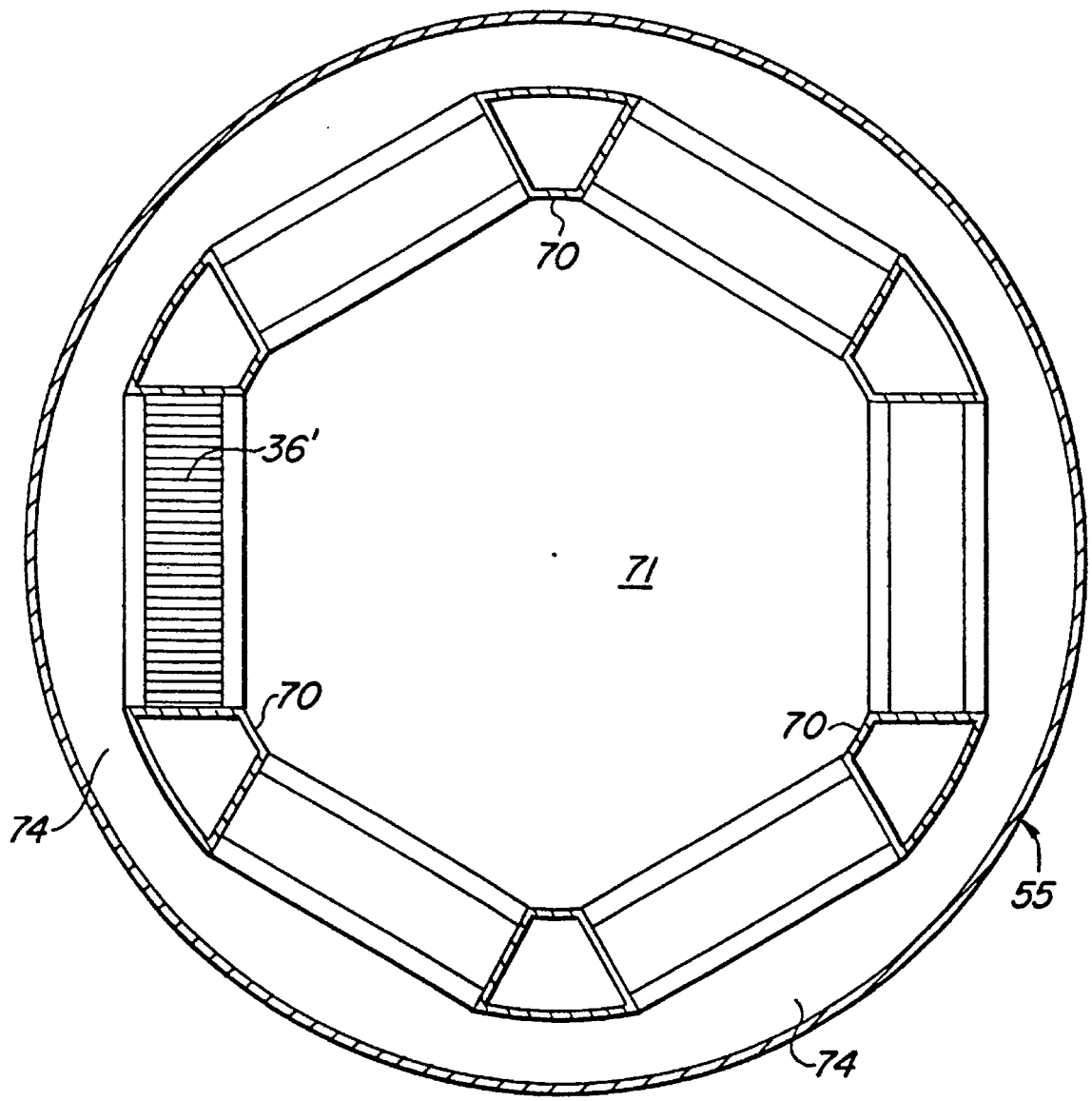
FIG. 14 is a section view along the line 14—14 of FIG. 13.

In another embodiment shown in FIGS. 13 and 14, the reactor stocks 36' are connected into a substantially polygon shape and housed by reactor vessel 55. Plates 70 shown in FIG. 14 define an inner distribution space 71 for the reaction fluid. As shown in FIG. 13, an upper baffle 72 and a lower baffle 73 form the upper and lower boundaries of distribution space 71. The reaction fluid enters the distribution space across upper baffle 72 via nozzle 64 and flows from inner distribution space 71 into an outer collection space 74. Outer collection space 74 eliminates the necessity for collection piping and the reaction fluid exits the vessel directly from an open nozzle 65 (not shown). Unlike the previous reactor configurations, the embodiment of FIGS. 13 and 14 shows the reaction fluid surrounding the reaction stacks 36'. A baffle 35, together with baffle 33 isolates the upper portion of vessel 55 to form a distribution chamber for delivery of the heat exchange fluid into inlets 52' in the manner previously described. The heat exchange fluid again exits the reactions stacks 36' through a manifold and piping system to substantially the same as that shown in FIGS. 10–12. Any flow of catalyst practiced in the embodiment of FIGS. 13 and 14 occurs in essentially the same manner as that previously described.

Figure 15:
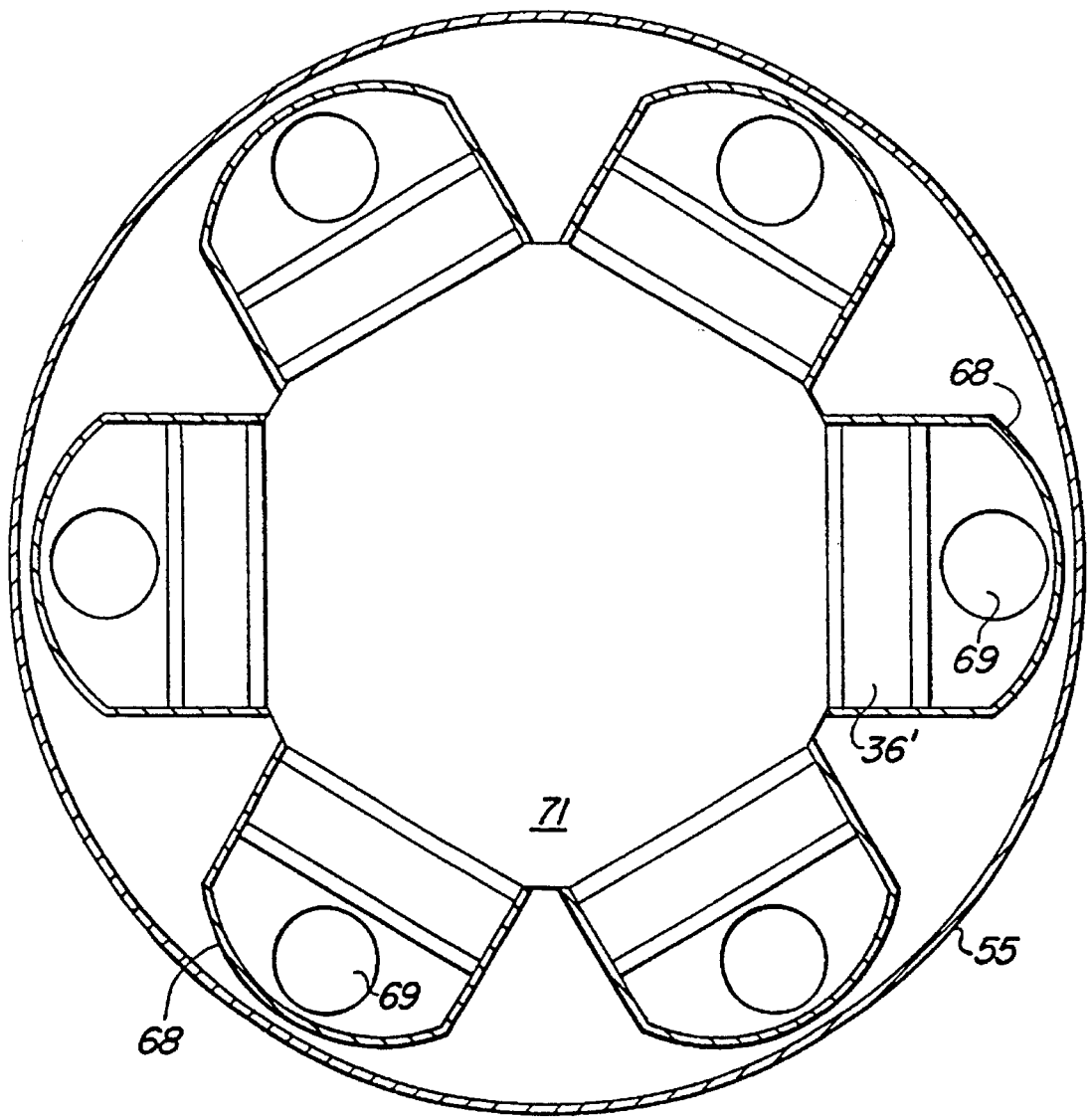
FIG. 15 is a transverse section view of another polygonal reactor arrangement according to the invention.

FIG. 15 shows an arrangement for reaction stacks 35' that combines the inlet distribution space of FIG. 13 and 14 with the collection baffles shown in FIGS. 10–12. In the arrangement shown in FIG. 15, any catalyst flow again occurs in the same manner as that previously described. In regard to reaction fluid, it flows into central chamber 71 in the manner associated with FIGS. 13–14 and is collected and withdrawn from the reaction stacks 36' in the manner associated with FIGS. 10–12. With the arrangement of reaction stacks as shown in FIG. 15, the flow of heat exchange fluid through the reactor may be controlled with two different piping and baffling arrangements. The entering heat exchange fluid may surround the reaction stacks 36' and fill the interior of vessel 55 while a manifold system similar to that depicted in FIGS. 10–12 withdraws the effluent heat exchange fluid. In another arrangement, baffles such as those depicted in FIGS. 13 and 14 seal off an upper volume of vessel 55 to distribute incoming heat exchange fluid to inlets 52' while the effluent heat exchange fluid surrounds reaction stacks 36' and is withdrawn from the open lower volume without the use of any manifold or piping system.

Catalytic reforming is a well established hydrocarbon conversion process employed in the petroleum refining industry for improving the octane quality of hydrocarbon feedstocks, the primary product of reforming being motor gasoline. The art of catalytic reforming is well known and does not require extensive description herein. Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasoline comprised of relatively large concentrations of naphthenic and substantially straight chain paraffinic hydrocarbons, which are subject to aromatization through dehydrogenation and/or cyclization reactions. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcyclopanffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al), the contents of which are herein incorporated by reference.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and the theta alumina with gamma and eta alumina giving the best results. An important property related to the performance of the catalyst is the surface area of the carried. Preferably, the carrier will have a surface area of from 100 to about 500 m$^2$/g. The particles are usually spheroidal and have a diameter of from about 1/16th to about 1/8th inch (1.5–3.1 mm), though they may be as large as 1/4th inch (6.35 mm). A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reforming operation will employ a moving bed reaction zone and regeneration zone. The present invention is applicable to moving bed and fixed bed zones. In a moving bed operation, fresh catalyst particles are fed to a reaction zone by gravity. Catalyst is withdrawn from the bottom of the reaction zone and transported to a regeneration zone where a multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. A moving bed system has the advantage of maintaining production while the catalyst is removed or replaced.

Another preferred hydrocarbon conversion process is the alkylation of aromatic hydrocarbons. In aromatic alkylation suitable aromatic feed hydrocarbons for this invention include various aromatic substrates. Such substrates can be benzene or alkylated aromatic hydrocarbons such as toluene. The acyclic feed hydrocarbon or alkylating agent that may be used in the alkylation reaction zone also encompasses a broad range of hydrocarbons. Suitable alkylating agents include monoolefins, diolefins, polyolefins, acetylenic hydrocarbons and other substituted hydrocarbons but are preferably $C_2$–$C_4$ hydrocarbons. In the most preferred form of this invention, the alkylation agent will comprise $C_2$–$C_4$ monoolefins.

A wide variety of catalysts can be used in the alkylation reaction zone. The preferred catalyst for use in this invention is a zeolite catalyst. The catalyst of this invention will usually be used in combination with a refractory inorganic oxide binder. Preferred binders are alumina or silica. Preferred alkylation catalysts are a type Y zeolite having an alumina or silica binder or a beta zeolite having an alumina or silica binder. The zeolite will be present in an amount of at least 50 wt. % of the catalyst and more preferably in an amount of at least 70 wt. % of the catalyst.

The alkylation reaction zone can operate under a broad range of operating conditions. Temperatures usually range from 100° C. to 325° C. with the range of about 150–275° C. being preferred. Pressures can also vary within a wide range of about 1 atmosphere to 130 atmospheres. Since liquid phase conditions are generally preferred within the reaction zone, the pressure should be sufficient to maintain the reactants in such phase and will typically fall in a range of from 10 to 50 atmospheres. Reactants generally pass through the alkylation zone at a mass flow rate sufficient to yield a liquid hourly space velocity from 0.5 to 50 hrs$^{-1}$ and especially from about 1 to 10 hrs$^{-1}$.

The alkylation zone is ordinarily operated to obtain an essentially complete conversion of the alkylating agent to monoalkylate and polyalkylate. To achieve this effect, additional aromatic substrate will usually be charged to the reaction zone. Thus, the feed mixtures are introduced into the reaction zone at a constant rate and a molecular ratio of about 1:1 to 20:1 aromatic substrate to alkylating agent with a ration of about 2:1 to 10:1 being preferred. As a result, in addition to product there will usually be a substantial mount of unreacted aromatic substrate that is removed with the product stream from the alkylation reaction zone. Additional details of aromatic alkylation processes can be found in U.S. Patent 5,177,285, the contents of which are hereby incorporated by reference.

Catalytic dehydrogenation is another example of an endothermic process that advantageously uses the process and apparatus of this invention. Briefly, in catalytic dehydrogenation, a feedstock is admixed with a recycle stream comprising hydrogen and contacted with catalyst in a reaction zone. Feedstocks for catalytic dehydrogenation are typically petroleum fractions comprising paraffins having from about 3 to about 18 carbon atoms. Particular feedstocks will usually contain light or heavy paraffins. For example a usual feedstock for producing a heavy dehydrogenation products will comprise paraffins having 10 or more carbon atoms. The catalytic dehydrogenation process is particularly applicable to the treatment of hydrocarbon feedstocks containing substantially paraffinic hydrocarbons which are subject to dehydrogenation reactions to thereby form olefinic hydrocarbon compounds.

A catalytic dehydrogenation reaction is normally effected in the presence of catalyst particles comprised of one or more Group VIII noble metals (e.g., platinum, iridium, rhodium, palladium) combined with a porous carrier, such as a refractory inorganic oxide. Alumina is a commonly used carrier. The preferred alumina materials are known as the gamma, eta and them alumina with gamma and eta alumina giving the best results. Preferably, the carrier will have a surface area of from 100 to about 500 m$^2$/g. The particles are usually spheroidal and have a diameter of from about 1/16th to about 1/13th inch (1.5–3.1 mm), though they may be as large as 1/4th inch (6.35 mm). Generally, the catalyst particles have a chloride concentration of between 0.5 and 3 weight percent. During the course of a dehydrogenation reaction, catalyst particles also become deactivated as a result of coke deposition and require regeneration, similar to that described in conjunction with the reforming process; therefore, in preferred form, the dehydrogenation process will again employ a moving bed reaction zone and regeneration zone.

Dehydrogenation conditions include a temperature of from about 400° to about 900° C., a pressure of from about 0.01 to 10 atmospheres and a liquid hourly space velocity (LHSV) of from about 0.1 to 100 hr$^{-1}$. Generally, for normal paraffins, the lower the molecular weight the higher the temperature required for comparable conversions. The pressure in the dehydrogenation zone is maintained as low as practicable, consistent with equipment limitations, to maximize the chemical equilibrium advantages. The preferred dehydrogenation conditions of the process of this invention include a temperature of from about 400°–700° C., a pressure from about 0.1 to 5 atmospheres, and a liquid hourly space velocity of from about 0.1 to 100 hr$^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent gas before while, or after being passed to the dehydrogenation zone. The diluent material may be hydrogen, steam, methane, carbon dioxide, nitrogen, argon and the like or a mixture thereof. Hydrogen is the preferred diluent. Ordinarily, when a diluent gas is utilized as the diluent it is utilized in mounts sufficient to ensure a diluent gas to hydrocarbon mole ratio of about 0.1 to about 20, with best results being obtained when the mole ratio range is about 0.5 to 10. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an mount to provide, calculated on the basis of equivalent water, about 1 to about 20,000 weight ppm of the hydrocarbon feed stream. About 1 to about 10,000 weight ppm of water addition gives best results when dehydrogenating paraffins having from 6 to 30 more carbon atoms. Additional information related to the operation of dehydrogenation catalysts, operating conditions, and process arrangements can be found in U.S. Pat. Nos. 4,677,237; 4,880,764 and 5,087,792, the contents of which are hereby incorporated by reference.

EXAMPLE

Figure 16:
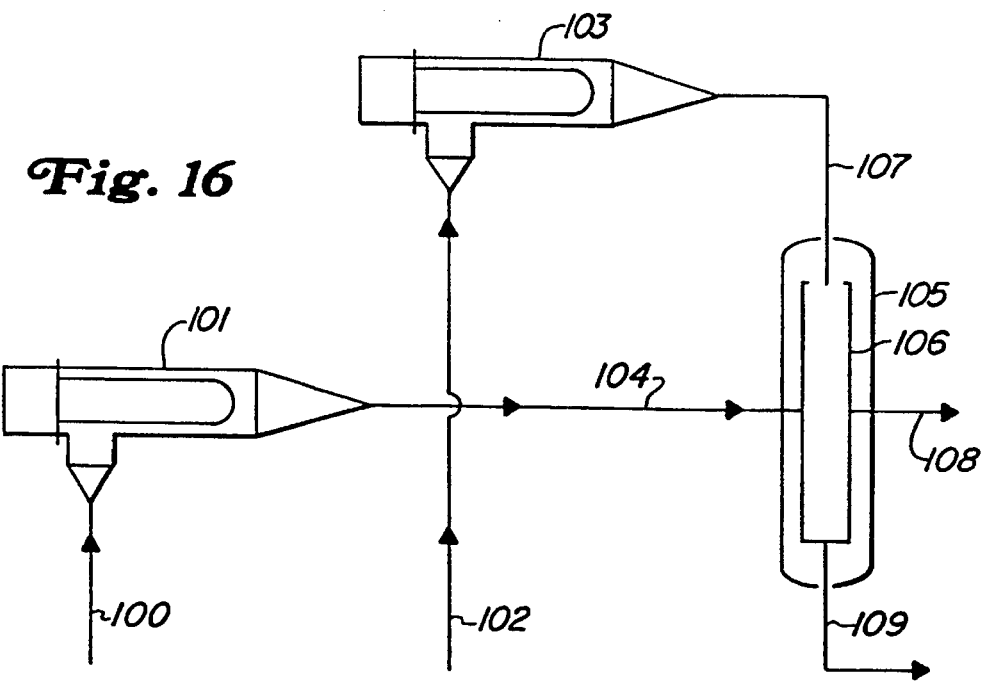
FIG. 16 is a process flow diagram of a dehydrogenation process according to the invention.

The effect of using the process and reactor arrangements of this invention to maintain isothermal conditions was investigated in a hydrocarbon conversion process for the dehydrogenation of paraffins. A simulation based on the ability of this invention to maintain isothermal conditions was prepared based on a feedstream having a composition given in Table 1. The isothermal conditions that result from this invention were simulated in a dehydrogenation process as depicted in FIG. 16.

In this process simulation, a feedstream carried via line 100 and having the composition given in Table 1 passes into a heater 101 that raises the feedstream temperature from approximately 600° F. to 850° F. At the same time, a heat exchange medium having the same relative composition as feedstream 100 is carried via line 102 into a heater 103. Heater 103 raises the temperature of the heat exchange fluid to approximately 890° F.

A line 104 carries the heated feedstream into a reactor 105 that directs the feedstream into a heat exchange bundle 106 designed in accordance with this invention. Reactor 105 has an arrangement to pass the feedstream through a circuit A containing a typical dehydrogenation catalyst comprising platinum on an alumina support. A line 107 carries the heat exchange fluid from heater 103 into reactor 105 which passes the heat exchange medium downwardly through the heat exchange bundle 106 in the manner previously described in relation to circuit B. The process simulation of reactor bundle 106 is based on the use of a heat exchange bundle 106 having three layers of catalyst, a vertical height of about 1.5 m, and a width of about 100 min. The plates defining the channels which alternate between catalyst and feedstream and the heat exchange fluid have a thickness of about 1.2 mm, corrugations with a depth of about 10 mm and a width of about 270 min. The plates are placed next to each other in an alternating pattern of corrugations, such that the peaks of the corrugations are in contact. The reactor operates at an average pressure of about 20 psig in both circuits A and B. The total pressure drop through the system for the reaction fluid is about 2 psi. Indirect heat exchange of the reaction fluid with the heat exchange medium provides an outlet mean temperature of about 850° F.

The converted reactant stream and the heating stream are recovered from the process. The product stream 108 having the composition given in the table is withdrawn from the reactor at a temperature of about 850° F. A line 109 carries the heat exchange medium from the reactor at a temperature of about 870° F. A comparison of process streams 100 and 108 shows the conversion of $C_{10}$ to $C_{14}$ paraffins to corresponding olefins.

TABLE 1

| Stream Description lb mole/hr | 100 | 102 | 108 |
| --- | --- | --- | --- |
| Molar Flow | 14.7195 | 15.2562 | 86.4876 |
| H$_2$O | 0.2044 | 0.2044 | 1.3073 |
| Hydrogen | 11.0421 | 11.5787 | 70.6316 |
| Methane | 0.0725 | 0.0725 | 0.4637 |
| Ethane | 0.1411 | 0.1411 | 0.9027 |
| Propane | 0.0308 | 0.0308 | 0.1968 |
| n-Butane | 0.0093 | 0.0093 | 0.0592 |
| n-Pentane | 0.0026 | 0.0026 | 0.0165 |
| n-Decane | 0.3509 | 0.3023 | 1.4082 |
| n-C11 | 1.4016 | 1.1810 | 5.6242 |
| n-C12 | 1.0262 | 0.8454 | 4.1177 |
| n-C13 | 0.4162 | 0.3340 | 1.6701 |
| n-C14 | 0.0207 | 0.0161 | 0.0829 |
| 1-Nonene | 0.0000 | 0.0001 | 0.0000 |
| 1-Decene | 0.0000 | 0.0486 | 0.0000 |
| 1-Undecene | 0.0000 | 0.2206 | 0.0000 |
| 1-Dodecene | 0.0000 | 0.1807 | 0.0000 |
| 1-Tridecene | 0.0000 | 0.0822 | 0.0000 |
| Total: | 14.7195 | 15.256 | 86.4876 |

What is claimed is:

1. A process for controlling the temperature of a reactant stream in a chemical reaction by indirect heat exchange with a heat exchange fluid across a multiplicity of plate elements, said process comprising:

a) passing a heat exchange fluid from a heat exchange inlet to a heat exchange outlet through a first set of elongated channels formed by a first side of said plates;

b) passing a reactant stream from a reactant inlet to a reactant outlet through a second set of channels formed by a second side of said plates; and, c) exchanging heat between said heat exchange fluid and said reactant stream by contacting at least one of said reactant stream and said heat exchange fluid with corrugations formed by said plates having a pitch angle or depth adjacent at least one of the reactant inlet and heat exchange inlet that differs from the pitch angle or depth of the corrugations adjacent the heat exchange outlet or reactant outlet.

2. The process of claim 1 wherein said second set of channels retains a heterogeneous catalyst between said plates.

3. The process of claim 1 wherein said heat exchange fluid is passed through said first set of channels in a transverse flow path relative to said reactant stream.

4. The process of claim 1 wherein said heat exchange outlet passes said heat exchange fluid to a second set of plates and said second set of plates forms a third set of elongated channels that is greater in number than said first set of elongated channels.

5. The process of claim 1 wherein said reactant stream comprises hydrocarbons.

6. The process of claim 1 wherein said heat exchange fluid comprises hydrogen.

7. The process of claim 1 wherein the average temperature of the reactant stream at the reactant inlet is within 10° F. of the average temperature of the reactant stream at the reactant outlet.

8. The process of claim 1 wherein said catalytic reaction is endothermic and the average temperature of the reactant stream at the reactant inlet is lower than the average temperature of the reactant stream at the reactant outlet.

9. The process of claim 1 wherein said catalytic reaction is exothermic and the average temperature of the reactant stream at the reactant inlet is higher than the average temperature of the reactant stream at the reactant outlet.

10. The process of claim 1 wherein said catalytic reaction is a reforming reaction, aromatization reaction or an aromatic alkylation reaction.

11. A process for the catalytic dehydrogenation of hydrocarbons, said process comprising:

a) passing a heating fluid from a first heat exchange inlet to a first heat exchange outlet through a first set of elongated channels formed at least in part by a first side of a first set of plates;

b) passing a feedstream comprising paraffins into a feed inlet at dehydrogenation conditions and contacting said feedstream with a dehydrogenation catalyst in a second set of channels formed by a second side of said first set of plates;

c) collecting a first dehydrogenation effluent stream comprising dehydrogenated hydrocarbons from said second set of channels through a first effluent outlet;

d) heating said feedstream with said heating fluid by contacting said feedstream and said heating fluid with corrugations formed by said plates and arranged such that the pitch angle with to the flow of heating fluid is greater at said first heat exchange outlet than at said first heat exchange inlet; and, e) recovering a product stream comprising at least a portion of said dehydrogenated hydrocarbons.

12. The process of claim 11 wherein said first dehydrogenation effluent stream is passed to a second intermediate inlet at dehydrogenation conditions and contacts a dehydrogenation catalyst in a third set of channels formed by a first side of a second set of plates; a heating fluid passes from a second heat exchange inlet to a second heat exchange outlet through a fourth set of elongated channels formed at least in part by a send side of said second set of plates; a second dehydrogenation effluent stream passes from said third set of channels through a second effluent outlet; and said first effluent stream is heated with said heating fluid by contact with corrugations formed by said second set of plates and arranged such that the pitch angle with respect to the flow of heating fluid is greater at said second heat exchange outlet than at said second heat exchange inlet.

13. The process of claim 1 wherein said dehydrogenation conditions include a temperature at said feed inlet that exceeds the temperature at said first effluent outlet by no more than 10° F.

14. The process of claim 11 wherein the temperature at said first effluent outlet is equal or greater than the temperature at said feed inlet.

15. The process of claim 11 wherein said feedstream comprises paraffins having at least 10 carbon atoms.

* * * * *

UNITED STATES PATENT AND TRADEMARK OFFICE
CERTIFICATE OF CORRECTION

PATENT NO: 5,600,053
DATED: 2/04/97
INVENTORS: CHRISTINE J.B. GIROD, WILLIAM W. LEVY, PETER R. PUJADO, JACQUES J.L. ROMATIER, AND DOMINIQUE J.J.M. SABIN

It is certified that error appears in the above-identified patent and that said Letters Patent is hereby corrected as shown below:

In column 18, line 15: Insert - - respect - - between "with" and "to";

line 35: Change "claim 1" to - - claim 11 - -.

Signed and Sealed this

Eighth Day of April, 1997

Attest:

BRUCE LEHMAN

Attesting Officer     Commissioner of Patents and Trademarks